US010803638B2

(12) United States Patent
Petculescu et al.

(10) Patent No.: US 10,803,638 B2
(45) Date of Patent: *Oct. 13, 2020

(54) EFFICIENT DISPLAY OF DATA POINTS IN A USER INTERFACE

(71) Applicant: Microsoft Technology Licensing, LLC, Redmond, WA (US)

(72) Inventors: Cristian Petculescu, Bellevue, WA (US); Marius Dumitru, Sammamish, WA (US); Radu C. Coman, Bellevue, WA (US); Amir M. Netz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,365

(22) Filed: Jul. 3, 2019

(65) Prior Publication Data
US 2019/0325625 A1 Oct. 24, 2019

Related U.S. Application Data

(63) Continuation of application No. 15/871,705, filed on Jan. 15, 2018, now Pat. No. 10,388,042.

(60) Provisional application No. 62/550,249, filed on Aug. 25, 2017.

(51) Int. Cl.
*G06T 11/20* (2006.01)
*G06F 16/248* (2019.01)

(52) U.S. Cl.
CPC .......... *G06T 11/206* (2013.01); *G06F 16/248* (2019.01); *G06F 2203/04806* (2013.01); *G06T 2200/24* (2013.01)

(58) Field of Classification Search
None
See application file for complete search history.

(56) References Cited

U.S. PATENT DOCUMENTS

2002/0067358 A1* 6/2002 Casari ................... G16B 45/00
345/440
2006/0276971 A1* 12/2006 Mohr ..................... G16B 45/00
702/19

OTHER PUBLICATIONS

Few, Stephen, and Perceptual Edge. "Solutions to the Problem of Over-plotting in Graphs." Visual Business Intelligence Newsletter (2008).*

* cited by examiner

*Primary Examiner* — Zhengxi Liu
(74) *Attorney, Agent, or Firm* — Fiala & Weaver P.L.L.C.

(57) ABSTRACT

Methods for efficient display of data points in a user interface are performed by systems and apparatuses. Efficient display of data point in a user interface includes maximizing coverage of data points prior to rendering. Coverage is determined using a radius value for represented data points in a data set. The radius may be increased to correspondingly generate additional coverage. Covered data points may be removed from the rendering subset as the radius is set and increased. The radius is increased until the number of represented data points to render is less than a threshold value. Multiple data sets may be efficiently rendered together.

20 Claims, 8 Drawing Sheets

EFFICIENT DISPLAY OF DATA POINTS IN A USER INTERFACE

CROSS-REFERENCE TO RELATED APPLICATION(S)

The present application is a continuation of U.S. application Ser. No. 15/871,705, entitled "EFFICIENT DISPLAY OF DATA POINTS IN A USER INTERFACE," filed on Jan. 15, 2018, which claims priority to U.S. application Ser. No. 62/550,249, entitled "EFFICIENT DISPLAY OF DATA POINTS IN A USER INTERFACE," filed on Aug. 25, 2017, the entirety of each of which is incorporated by reference herein.

BACKGROUND

Computer systems and displays are used for rendering data points for viewing by users. In cases with very large data sets, such as millions of points in a two-dimensional (2D) space, rendering such large data sets leads to a cluttered display space, as well as using large amounts of computer system and display resources, including memory and processing cycles, as well as having long rendering times and lack of scalability. Current approaches to displaying such very large data sets implement sampling of the data points at regular intervals, which leads to loss of fidelity of the overall data, and may lead to outlying data points being ignored.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Systems, apparatuses, devices, and methods for efficient display of data points in a user interface are disclosed herein. Plots with large numbers of data points are often desired to be displayed in resolutions too low to support display of all data points, and/or leading to the data points being displayed in a crowded fashion. Accordingly, efficient display of data points in a user interface is enabled herein. A reduced set of the data points is determined for display that significantly preserves the original coverage provided by the original set of data points. An initial radius value for displayed data point representations is selected and applied to determine an amount of coverage provided to the original set of data points. At least some of the data points covered (e.g., overlapping) at that radius value may be removed, thereby forming a rendering subset of data points. The radius may be increased to correspondingly generate additional coverage per displayed data point representation. As the radius value is increased, further covered data points may be removed from the rendering subset. The radius is increased (and optionally decreased for fine tuning) until the number of represented data points to render is sufficiently reduced (e.g., the number being less than a threshold value).

In one example, a system is configured and enabled for efficient display of data points in a user interface. The system includes a radius generator, a bin manager, a subset generator, and a communicator. The radius generator selects a first radius for representing data points of a data set. The bin manager groups the "represented data points" (the data points assigned the selected first radius) in a plurality of bins, which may correspond to regions of plot diagrams. For each bin, the subset generator determines neighboring bins which contain data points that cover (e.g., substantially overlap) the data points in the bin. The subset generator lists the covered data points in a first subset of the data set, and lists the covering data points in a second subset of the data set. The data points of the second subset are a reduced version of the entire data set, but are representative of the entire data set for display purposes. Thus, the communicator may provide the data points of the second subset to a display for rendering. However, the radius may be iteratively increased, and the determination of covered and covering data points in bins may be iteratively performed, to successively refine the second subset (the covering data points) for even more efficient rendering of the data set (e.g., to achieve a target count for a number of rendered data points).

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
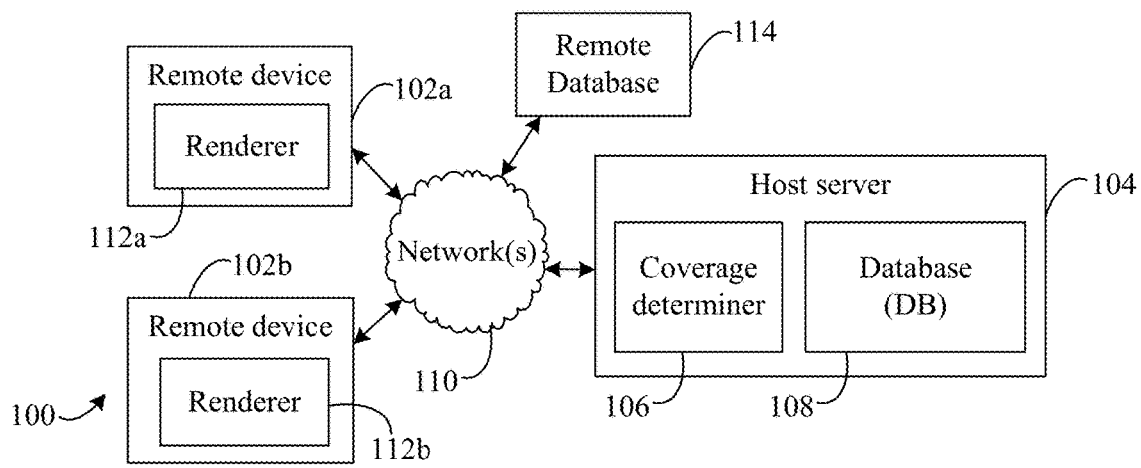
FIG. 1 shows a block diagram of a networked system for efficiently displaying data sets, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner.

Still further, it should be noted that the drawings/figures are not drawn to scale unless otherwise noted herein. It should also be noted that while some of the drawings/figures show data point representations as filled or as un-filled circles in data plots, either type of representation may be used in embodiments, and other shapes, including shapes of different sizes, are also contemplated. The terms "data point" and "data point representation" may be used interchangeably in the context of renderings and plots herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for efficient display of data points. In particular, Subsection II.A describes example system and method embodiments, Subsection II.B describes example data point representation radius embodiments, Subsection II.C describes example coverage determination and bin embodiments, Subsection II.D describes example embodiments for adding data points back for rendering, and Subsection II.E describes example embodiments for remote devices and rendering multiple data sets.

Section III below describes example mobile device and computing device embodiments that may be used to implement features of the embodiments described herein. Section IV below describes some additional examples and advantages, and Section V provides some concluding remarks.

II. Example Embodiments for Efficient Display of Data Points

Methods, systems, apparatuses, devices, and computer program products are provided for efficient display of data points, including very large sets of data points, in a user interface (UI). Such embodiments enable efficient display of data points by selecting a subset of data points to provide coverage of all the data points when displayed.

Data sets may vary in size from thousands of data points to very large data sets with millions of data points. Users desiring to view renderings of such data sets often view plots, such as scatter plots, on a monitor or display of a computing device. These monitors and displays have limited space for rendering, limited resolution, and limited processing and memory resources for rendering. For instance, on a typical display, a browser, UI, or other "renderer" may represent a relatively small visual on the screen, e.g., in software services and applications such as Power BI® from Microsoft Corporation of Redmond, Wash. For example, a two-dimensional display region for rendering may be 600× 600 pixels, which is not sufficient displaying a distribution of a million data points. Furthermore, rendering large data sets on a browser can take a very long time.

Because the display regions of renderers for viewing plots are relatively small/low resolution compared with the size of large data sets, many data points may be covered by other data points in renderings. Accordingly, the embodiments disclosed herein perform large-data set renderings by avoiding rendering these "covered" data points at all. For relatively smaller display regions, a target count of data points may be pre- or dynamically-determined for representation of the entire data set, where the target count is a threshold value or a numerical limit. The embodiments disclosed herein thus achieve faster and more efficient renderings, with respect to processing cycles and memory footprint, of large data sets in a UI/renderer (improving user interactions for the UI). For instance, in embodiments, given a limit for the amount or number of data points to be rendered, the embodiments disclosed herein determine a reduced set (or subset) of data points less than the total number of data points in a large data set that substantially preserves the original cover while maintaining fidelity/accuracy of the data, including outlier data points, so that the user notices little to no difference in the rendered data. In embodiments where a server performs the described techniques for coverage determination, and provides reduced sets of data point representations over a network to a renderer at a remote device, the provision of reduced sets of data point representations also reduces loads with respect to network bandwidth.

According to embodiments, a radius for data point representations is selected such that many data points would be "covered" by others when rendered given the representation radius. Multiple iterations may be performed to find a radius that leaves a subset of "visible" data points having a number below a target count, but close enough to the target count that a rendering of only the set, and not the "covered" data points, appears to represent the entire data set when viewed by a user. Accordingly, given a large set of data points that a renderer cannot render efficiently, an effective sample representation of the data set that is within a limit for the number of data points and maintains data fidelity is provided. The disclosed embodiments also provide for scalability, e.g., for zooming in and out of rendered data sets.

In other words, the embodiments disclosed herein provide a sample subset of data points from a data set (e.g., a subset) that is manageable by the UI/renderer, while preserving as much of the cover as possible given a target count restriction (i.e., a threshold or numerical limit). Utilizing the cover of the data points, the general shape of the data and the outliers are maintained when the data points are plotted in a 2D space. Additionally, speed and system efficiency for renderings are improved, and the responsiveness of the UI/renderer allows the user to have a positive experience and more easily and conveniently interact with and view the data.

A. Example System Embodiments

In embodiments, systems and devices may be configured in various ways to achieve more efficient displays of data sets. For instance, FIG. 1 is a block diagram of a rendering system 100, according to embodiments. Rendering system 100 is configured to enable the efficient displaying of data sets in a UI, including very large data sets, according to embodiments. As shown in FIG. 1, rendering system 100 includes a remote device 102a, a remote device 102b, and a host server 104, which may communicate with each other over a network 110. It should be noted that the number of remote devices and host servers of FIG. 1 is exemplary in nature, and greater numbers of each may be present in various embodiments. Additionally, any combination of components illustrated may comprise a system for efficiently displaying data sets in a UI, according to embodiments.

Remote device 102a, remote device 102b, and host server 104 are configured to be communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Host server 104 may comprise one or more server computers or computing devices, which may include one or more distributed or "cloud-based" servers. Host server 104 is configured to receive requests from users, such as via a renderer 112a and/or a renderer 112b (or other UI), respectively from remote device 102a and/or remote device 102b via network 110. As illustrated, host server 104 includes a coverage determiner 106 and a database 108, although database 108 may be located remotely from host server 104 in embodiments, as shown for a remote database 114 connected via network 110. It is also contemplated herein that while only a single database 108 is shown for brevity and illustrative clarity, multiple databases 108 may be present in embodiments, and/or multiple remote databases 114. In embodiments, host server 104 is configured to provide renderers, such as renderer 112a and/or renderer 112b, to remote device 102a and/or remote device 102b via network 110. In an embodiment, host server 104 may include an instance of a renderer to render data sets as described herein.

Database 108 and/or remote database 114 may be configured to store data such as, but not limited to, data sets as described herein. Database 108 and/or remote database 114 may each be any type of database and may be read/write accessible by various entities. Coverage determiner 106 may be hardware, software, firmware, and/or any combination thereof, and may be configured to perform any functions/operations described herein for efficiently displaying data sets.

Remote device 102a and remote device 102b may be any type of computing device or computing system, including a terminal, a personal computer, a laptop computer, a tablet device, a smart phone, etc., that may be used by users to request data sets for rendering, such as via renderer 112a and/or renderer 112b. For instance, as shown in FIG. 1, remote device 102a includes renderer 112a, and remote device 102b includes renderer 112b. Remote device 102a and remote device 102b are configured to respectively activate or receive renderer 112a and/or renderer 112b locally or remotely to enable a user to request and render data sets efficiently according to the embodiments herein. In embodiments, remote device 102a and/or remote device 102b may include a stored instance of a renderer, as described above, received from host server 104. In embodiments, renderer 112a and/or renderer 112b may be any type of service/application UI, browser, client or electronic communication application, messaging applications, portal, productivity application, and/or the like.

Remote device 102a and/or remote device 102b may include an instance of coverage determiner 106, and/or may include an instance of a database that stores data sets such as database 108. Coverage determiner 106 is configured to enable efficient display of data points in a user interface. In particular, coverage determiner 106 receives a set of data points from database 108, and is configured to determine a reduced set of the data points for display that significantly preserves the original coverage provided by the received set of data points.

Figure 2:
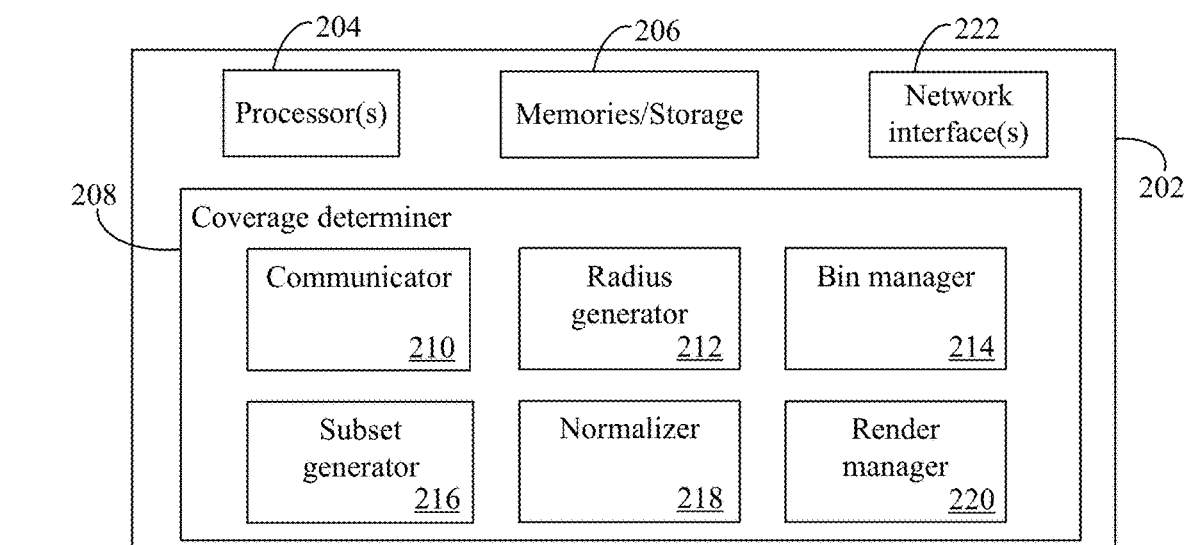
FIG. 2 shows a block diagram of a system for efficiently displaying data sets, according to an example embodiment

Accordingly, a host system, such as host server 104, may be configured in various ways for efficient display of data points. For example, FIG. 2 is a block diagram of a computing system 200 configured for efficient display of data points. Computing system 200 is an embodiment of host server 104 of FIG. 1, and may be an embodiment of remote device 102a and/or remote device 102b. Computing system 200 is described as follows.

Computing system 200 may be any type of server computer or computing device, as mentioned elsewhere herein, or as otherwise known. As shown in FIG. 2, computing system 200 includes one or more of a processor ("processor") 204, one or more of a memory and/or other physical storage device ("memory") 206, a network interface(s) ("network interface") 222, and a coverage determiner 208 which may be an embodiment of coverage determiner 106 of FIG. 1. Computing system 200 may also include additional components (not shown for brevity and illustrative clarity) including, but not limited to, components and subcomponents of other systems herein, such as a database such as database 108 and/or a renderer such as renderer 112a, as well as those described below with respect to FIGS. 13 and 14, such as an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of coverage determiner 208, which may be implemented as computer program instructions for application session monitoring and control such as program logic for efficient display of data points, etc., as described herein. Memory 206 is configured to store such computer program instructions, as well as to store other information and data described in this disclosure including, without limitation, a database such as database 108, etc.

Network interface 224 may be any type of wired and/or wireless network adapter, modem, etc., configured to enable computing system 200 to communicate with other devices over a network, such as communications between computing system 200 and other devices utilized in a network during efficient display of data points (e.g., remote device 102a, remote device 102b, and/or remote database 114) over a network such as network 110 as described above with respect to FIG. 1.

Coverage determiner 208 includes a plurality of components for performing the techniques described herein for efficient display of data points. As shown, coverage determiner 208 includes a communicator 210, a radius generator 212, a bin manager 214, a subset generator 216, a normalizer 218, and a render manager 220. While shown separately for illustrative clarity, in embodiments, one or more of communicator 210, radius generator 212, bin manager 214, subset generator 216, normalizer 218, and/or render manager 220 may be integrated together and/or as a part of other components of system 200. For instance, bin manager 214 may be included in subset generator 216. In some embodiments, less than all of the components of coverage determiner 208 illustrated in FIG. 2 may be included.

Figure 3:
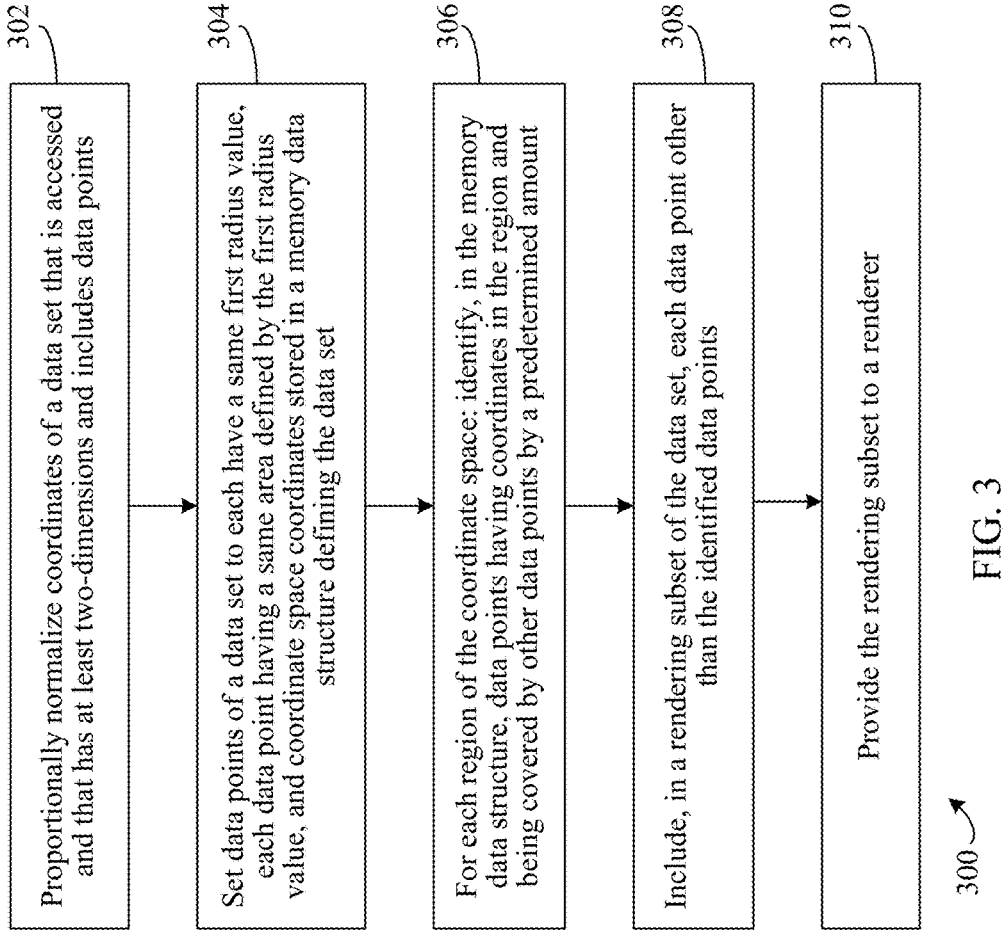
FIG. 3 shows a flowchart for efficiently displaying data sets, in accordance with an example embodiment.

Coverage determiner 208 may operate in various ways to enable efficient display of data sets. For instance, FIG. 3 shows a flowchart 300 for efficient display of data points, according to an example embodiment. Coverage determiner 208 may operate according to flowchart 300, in an embodiment. Further structural and operational examples will be apparent to persons skilled in the relevant art(s) based on the following description. Flowchart 300 is described as follows with respect to computing system 200 of FIG. 2.

Flowchart 300 begins at step 302. In step 302, coordinates of a data set that is accessed and that has at least two-dimensions and includes data points are proportionally normalized. Normalizer 218 is configured to receive a data set, such as a data set stored in database 108 (FIG. 1). The data set may include any number of data points that each include corresponding values for multiple axes (e.g., X-axis and Y-axis values) to form coordinate values. Normalizer 218 is configured to normalize the coordinates and/or axes for data points in the data set. For example, a data set showing incomes (e.g., X-axis) for baristas in U.S. cities (Y-axis) may be normalized from dollars and numbers per city to a simple scale of 1 to 100 (i.e., generic units). Normalization allows for efficient and uniform generation of bins, as described herein.

In step 304, data points of a data set are set to each have a same first radius value, each data point having a same area defined by the first radius value, and coordinate space coordinates stored in a memory data structure defining the data set. For instance, a first radius for data points of the data set is selected or set. Radius generator 212 is configured to select and/or set the first radius for representing the data points. The selected/set first radius value corresponds to a radius for displaying representations of data points of the data set, such as representing data points as circles with the selected first radius. For example, the selected first radius may be on the same scale for generic units as described for the normalization of the data set above in step 302, such as approximately 0.1 for normalized 0 to 100 axes. It should be noted however that any other first radius may be selected, in embodiments. The first radius may be selected from one or more predefined radius values stored in memory 206, may be selected based on a number of data points in a given data set to be represented, and/or the like. The area of the data points in the data set may be defined by the radius according to the equation for the area of a circle: area=$\pi \cdot radius^2$.

When the first radius value is set for each of the data points, the data points in the data set will have the same area defined by the first radius value. The coordinate space coordinates may be stored in a memory data structure defining the data set, where the memory data structure may be stored and/or maintained in a memory, such as memory 206. The memory data structure may be an array of information, e.g., a multidimensional array, a database structure, a table, a list, etc., as would be appreciated by those having skill in the relevant art(s) and the benefit of this disclosure.

In step 306, for each region of the coordinate space, data points having coordinates in the region and being covered by other data points by a predetermined amount are identified in the memory data structure. For instance, in an embodiment, data points are associated with a plurality of bins, e.g., a grid of bins, corresponding to the regions of the coordinate space. Bin manager 214 is configured to associate represented data points of a data set according to the plurality of bins based on coordinates of data points being included in the area of a given bin.

Any size and number of bins may be used, which may be determined by bin manager 214 based on the resolution of a UI that will be used to render represented data points of a data set, the number of data points, the number of data points to be represented, etc. Bins may be effectively organized as a grid of bins (e.g., shown as squares in the Figures described below) over a rendering region of the UI (although other tessellations of shapes, e.g., hexagons, are contemplated herein). When bin manager 214 determines that the data points are associated according to the grid of bins, subset generator 216 may be activated.

For each bin, covering data points having coordinates in the bin and coordinates in neighboring bins that cover a portion of any data points contained in the bin may be determined. A given data point may be determined to have a portion of itself covered by another data point if there is overlap in the areas of the data points. For example, if the coordinates of two data points are within a determined distance of each other, e.g., a distance of twice the first radius value, there is some overlap of the areas of the data points.

Data points determined to be covered by the covering data points are included in a first subset of the data set; and each data point in the grid of bins not included in the first subset is included in a second subset, or rendering subset, of the data set. Subset generator 216 is configured to perform step 306. In some embodiment, only data points in same bin and in neighboring bins of a given data point are considered in determining coverage for the given data point. For instance, each bin in a grid of bins may have a number of surrounding (e.g., adjacent or neighboring) bins. In an example, each region in a grid of region may have eight neighboring region. Thus, according to this example, square bins arranged in a grid would each have eight neighboring bins, although additional neighboring bins may be included as surrounding/adjacent bins. Each bin, and its surrounding bins, may include one or more represented data points in the display of the data points (based on the coordinates of the data points). For a given bin, each represented data point located within that bin (e.g., having coordinates in the bin in the grid) may be processed to determine if the represented data point is covered by other represented data points in the given bin as well as other represented data points in adjacent bins. Accordingly, covered data points may be identified.

In step 308, each data point other than the identified data points is included in a rendering subset of the data set. According to embodiments, subset generator 216 may be configured to add represented data points to one or more subsets, e.g., the rendering subset, for rendering purposes. For instance, a subset may indicate represented data points to be rendered, e.g., the rendering subset, or to not be rendered, e.g., a different subset such a non-rendering subset. As an example, subset generator 216 is configured to add represented data points determined to be covered to a first subset that will not be rendered, and to add covering (and/or uncovered) data points to a second subset, i.e., the rendering subset, for rendering. Step 308 is then repeated for the remaining represented data points in each bin that has not yet been fully processed for represented data points and their respective coverage determinations.

In step 310, the rendering subset is provided to a renderer. In embodiments, the render may render the rendering subset in a user interface (UI) for viewing by a user. As noted, subset generator 216 is configured to add the data points that are not included in the first subset (i.e., not covered) as described in step 308 to a second, rendering subset. The represented data points in this rendering subset are maintained for rendering purposes, as they are displayed to show themselves, while covering the data points in the first subset, which are not rendered. When generated, the rendering subset may be provided for rendering by a UI via communicator 210 and/or network interface 224.

A represented data point within the rendering subset may be assigned different characteristics based on density of the data set associated with the location of the represented data point. Represented data point characteristics may vary in color, hue, brightness, opacity, shape, and/or the like, in this manner. Accordingly, when provided for rendering, and/or when rendered, these characteristics may indicate to a user that different areas of the rendered plot have varying densities that may be hidden from view by coverage. Additionally, statistics and/or a legend may be provided with the second subset as a guide to the rendered represented data points.

Figure 4:
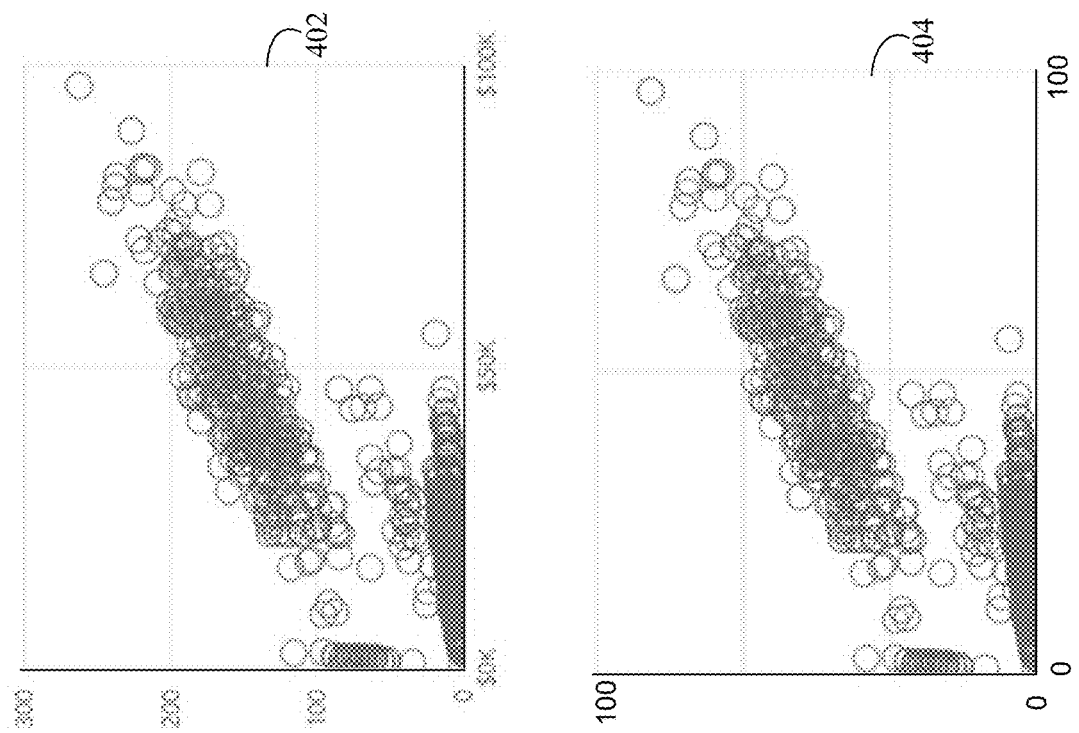
FIG. 4 shows first and second plot diagrams for efficiently displaying data sets, in accordance with an example embodiment.

Accordingly, flowchart 300 (and coverage determiner 208) enables the efficient display of data points of a data set, but selecting a second subset of the data points for display, as coverage for a first subset of the data points that is not displayed. Examples of plots, data points of varying radiuses, and bins are shown in the figures described as follows. For instance, FIG. 4 shows example first and second plot diagrams 402 and 404 for efficiently displaying data sets, including normalization. For purposes of illustration and not limitation, plot diagrams 402 and 404 are described with respect to the normalization example of step 302 in flowchart 300 of FIG. 3.

Plot diagram 402 shows a data plot of quantity (y-axis, numbers of baristas in U.S. cities from 0 to 300, as shown) versus dollar amount (x-axis, salaries from $0 to $100 k, as shown). In embodiments, plot diagram 402 may comprise a 600 pixel×600 pixel display region of a renderer or UI, or other sized display regions in other embodiments. As illustrated, plot diagram 402 includes a plurality of data points having four main trending areas, each having data point-dense sub-regions and data point outliers.

Normalized plot diagram 404 exemplarily shows a normalized version of plot diagram 402 described above. That is, the quantity of plot diagram 402 (y-axis) and the dollar amount of plot diagram 402 (x-axis) are each normalized to correspond to "unit-less" or "generic unit" values from 0 to 100 while maintaining proportionality (e.g., aspect ratio) of the relationship between the x- and y-axes. In embodiments, similar to plot diagram 402, normalized plot diagram 404 may comprise a 600 pixel×600 pixel display region of a renderer or UI, or other sized display regions in other embodiments. Normalized plot diagram 404 includes the plurality of data points of plot diagram 402 having four main trending areas, each having data point-dense sub-regions and data point outliers.

In other words, the X- and Y-coordinates of plot diagram 402 have been transformed to be between 0 and 100, while keeping the plot proportions. In this way, a standard, normalized plot, i.e., normalized plot diagram 404, allows for determinations about data points therein, such as locations within bins, to be more efficiently made, reducing data-dependent complexity, as described in further detail herein.

It should also be noted that in some embodiments, different normalization axes may be used for different sized rendering/display regions, such as 0 to 50 for a 300 pixel×300 pixel region, 0 to 200 for a 1200 pixel×1200 pixel region, etc., and non-square rendering regions are also contemplated.

Note that additional iterations of the above-described processing may be performed based on increased/decreased radius values, leading to the determination of more refined covering subsets of data points, and thus to even more efficiently rendered sets of data points. Embodiments for such further processing are described in the following subsection.

B. Example Data Point Representation Radius Embodiments

In an embodiment, if a target count is not met for a given data set, e.g., a numerical limit of represented data points is met or exceeded, the radius of the represented data points may be increased. Using this larger radius, steps of flowchart 300 of FIG. 3 (e.g., step 308) may be repeated or iterated until the target count is met. In this manner, the set of covering data points may be refined (e.g., reduced for larger radius), leading to even more efficient rendering of a data set.

Figure 5:
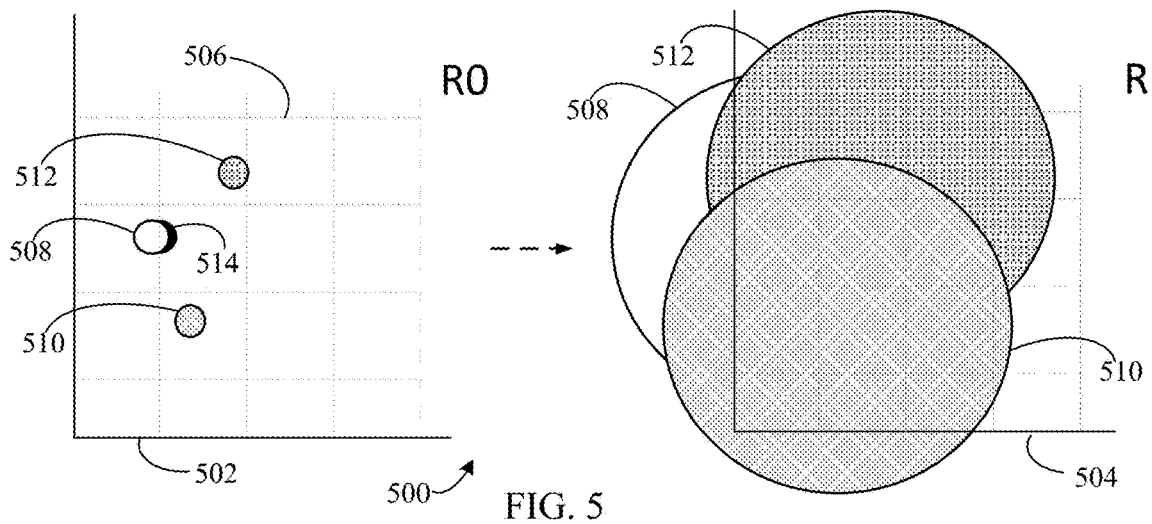
FIG. 5 shows first and second bin diagrams for efficiently displaying data sets, in accordance with an example embodiment.

For example, FIG. 5 shows plot diagrams 500 for efficiently displaying data sets, in accordance with an embodiment. Plot diagrams 500 include a first radius data plot 502 and a second radius data plot 504. First radius data plot 502 has data point representations with a radius R0, and second radius data plot 504 has data point representations with a radius R that is greater than R0.

Figure 6:
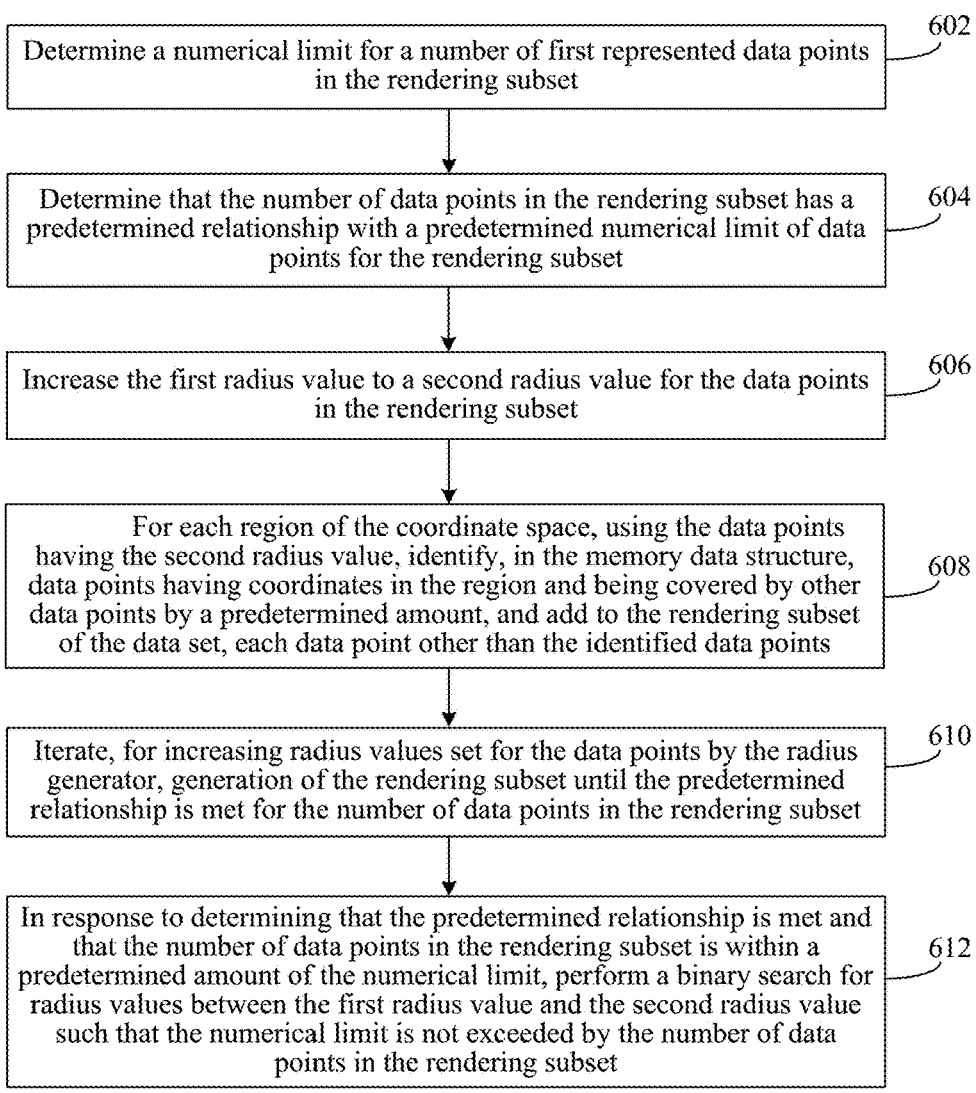
FIG. 6 shows a flowchart for efficiently displaying data sets, in accordance with an example embodiment.

Furthermore, FIG. 6 shows a flowchart 600 for efficient display of data points, according to an example embodiment. For purposes of illustration, flowchart 600 of FIG. 6 is described with respect to system 200 of FIG. 2 and its subcomponents including coverage determiner 208. Flowchart 600 is an example embodiment of flowchart 300 of FIG. 3. Further structural and operational examples will be apparent to persons skilled in the relevant art(s) based on the following description.

According to embodiments, data points in a data set are represented by shapes, such as circles of equal size, referred to as represented data points or "representations" herein. These represented data points include dimensional parameters, such as a radius value for circle representations, although other shapes and corresponding parameters are contemplated herein. Referring back to step 304 of flowchart 300 in FIG. 3, a first radius for representing data points of the data set may be selected or set such that each data point represented for the data set has the same radius value and the same area. As exemplarily shown, first radius data plot 502 has four represented data points with a radius R0: a represented data point 508, a represented data point 510, a represented data point 512, and a represented data point 514, that are grouped according to a plurality of bins 506 as described above in step 306 of flowchart 300. For an initial iteration, a first radius value for R0 may be selected as 0.1 relative to a normalized data plot, such as normalized data plot 404 of FIG. 4 having axes that range from 0 to 100 in a 600 pixel×600 pixel display region of a renderer or UI. As shown, the four represented data points having radius R0 in first radius data plot 502 include a single case of overlap or coverage, as may be determined according to step 308 of flowchart 300. That is, represented data point 508 covers represented data point 514. Accordingly, represented data point 514 may be added to a first subset of represented data points (to not be displayed and not included in the rendering subset) and may or may not be considered for further coverage analysis according to flowchart 300.

Flowchart 600 is described as follows. Flowchart 600 begins at step 602. In step 602, a numerical limit for a number of data points in the rendering subset is determined. Numerical limits for represented data points may be based on a size of a data set, a resolution for rendering, processing and/or memory capabilities of systems/devices, and/or the like. Numerical limits may be predefined and stored a memory such as memory 206, or may be determined dynamically coverage determiner 208 (e.g., via render manager 220) and/or processor 204.

In step 604, it is determined that the number of data points in the rendering subset has a predetermined relationship with a predetermined numerical limit of data points for the rendering subset. Render manager 220 may be configured to determine relationships between the number of represented data points in the rendering subset (e.g., as described in flowchart 300) and the numerical limit determined in step 602. For instance, when the number of first represented data points in the rendering subset is greater than, or is equal to, the numerical limit, additional represented data points may be removed until the total number is less than, or is equal to, the numerical limit. It is contemplated herein that any relationships between the number of data points and the predetermined numerical limit of data points may be used.

As an example scenario, referring again to FIG. 5, suppose the numerical limit is '2'. As noted above, in first radius data plot 502, represented data point 314 is covered and may be added to the first subset (e.g., removed from rendering and from further coverage processing, and not to be included in the rendering subset). However, three represented data points remain (i.e., represented data point 508, represented data point 510, and represented data point 512), which is greater than the numerical limit of '2'.

In step 606, the first radius value is increased to a second radius value for the data points in the rendering subset. Radius generator 212 is configured to increase the radius value for represented data points to a larger second radius value in order to increase the coverage of data points by other data points.

Continuing with the example scenario above in step 604, second radius data plot 504 is shown with the three remaining represented data points represented data point 508, represented data point 510, and represented data point 512 each having a value for radius R that is greater than the value for R0. According to embodiments, a radius value for represented data points may be increased to cause coverage or overlap, or additional/increased coverage or overlap, of represented data points. As shown, when the represented data points of data plot 502 have their radius value increased from R0 to R as in second radius data plot 504, there is additional coverage (i.e., overlap) between the represented data points: represented data point 508 is covered by represented data point 510 and represented data point 512. Represented data point 508 is covered and is not to be included in the rendering subset, and therefore, represented data point 508 may be added to the first subset, and the number of represented data points no longer exceeds the numerical limit (i.e., there are now two uncovered data points for the rendering subset).

The value of radius R (a second, increased radius value) may be preset or predetermined, such as approximately 1.41 or $\sqrt{2}$, for normalized 0 to 100 axes in a 600 pixel×600 pixel display region of a renderer or UI, although other values for R may be used in embodiments. In some cases, increases (or decreases) in radius values as described herein may be dynamically applied or be adaptive based on factors associated with a ratio of total data points in a data set versus a target count value (e.g., the predetermined numerical limit of data points), a desired or maximum time for rendering a data set or subset of the data set, and/or the like (e.g., another threshold or numerical limit). Increases, or decreases, in radius values may be applied by factors (multiplication of a current radius by the factor), by linear progression (adding a set value to the current radius), or by any combination thereof. As shown in FIG. 5, it should be noted that the centers of the circles, i.e., their coordinates, did not move or change, only that the radius value increased in size from R0 to R, according to embodiments.

In step 608, for each region of the coordinate space, data points having coordinates in the region and being covered by other data points by a predetermined amount are identified in the memory data structure using the data points having the second radius value, and each data point other than the identified data points is added to the rendering subset of the data set. That is, in essence, steps 306 and 308 of flowchart 300 in FIG. 3 may be performed with an increased, second radius value, as described above, for each bin (corresponding to the regions of the coordinate space) according to step 608 in order to add additional represented data points to the first subset via increased coverage, and effectively remove these additional represented data points from the rendering subset. In other words, the coverage processing may iterate over all bins with an increased radius value for represented data points to comply with the predetermined numerical limit of data points (i.e., a target value).

Subsequent to step 608, if the predetermined relationship is met or exists, e.g., the predetermined numerical limit is not exceeded (or reached in embodiments), represented data points in the rendering subset, that are not in the first subset, may be provided for rendering as in step 310 of flowchart 300 in FIG. 3. If the predetermined relationship is not met or does not exist, e.g., the numerical limit remains exceeded following step 608, flowchart 600 may proceed to step 610.

In step 610, generation of the rendering subset is iterated for increasing radius values set for the data points by the radius generator until the predetermined relationship is met for the number of data points in the rendering subset. That is, step 604, step 606, and step 606 may be repeatedly performed, as described above, until the predetermined relationship is met, e.g., the numerical limit is met or not exceeded, the target count is satisfied, etc.

Simply put, the techniques described herein take into account that given a set of circles or the represented data points, the radius value, R, may be determined for the represented data points such that a number of circles, X, smaller than or equal to a given target count, C, covers all the other circles not included in X within an acceptable tolerance (described in further detail below). The techniques described herein also provide for finding a final value of R that gives an X very close to C, such as approximately equal to, but less than, C. The target count/numerical limit may be 1000 or 10,000 represented data points, or any other number, and may be predetermined or dynamically adapted based on the number of data points in a data set. For example, the target count/numerical limit may be based on the rendering region of the UI, including the resolution thereof, resource characteristics of the rendering device (e.g., processor/memory capabilities), and/or the like.

In embodiments, for determining the final value of R, the techniques herein may start from a relatively small radius value R0, such as 0.1 as noted above, and increase values for representation radius until a final value for R that satisfies the above is determined. In embodiments, R0 may be chosen as a value which is smaller than what would actually be used in rendering a plot or chart for a data set. According to some embodiments, the value for R0 may be chosen as a value that is not so small as to require more iterations of the described techniques (using more time, iterations, and resources to achieve a quality rendering), as differences in quality for renderings may not be visible to the eye of the user when R0 is less than 0.1 as the starting radius.

The represented data points (i.e., circles) in FIG. 5 with radius R0 in first radius data plot 502 illustrate that represented data point 514 is approximately or substantially "covered," and those with radius R in second radius data plot 504 illustrate that represented data point 508 is approximately or substantially "covered." Such a scenario for determining coverage allows a system or device, such as computing system 200 utilizing coverage determiner 208, to include the covered represented data points in a subset of represented data points that are not used for rendering the data set and/or to keep only the "uncovered" represented data points in a subset for rendering.

In step 612, in response to determining that the predetermined relationship is met and that the number of data points in the rendering subset is within a predetermined amount of the numerical limit, a binary search is performed for radius values between the first radius value and the second radius value such that the numerical limit is not exceeded by the number of data points in the rendering subset. This refinement operation is described in further detail in the following subsection.

Additionally, coverage processing and the described embodiments above may be performed using bins as described in the subsection below.

C. Example Coverage Determination and Bin Embodiments

According to the embodiments described herein, efficient rendering for data sets in a UI is provided, including very large data sets. In some embodiments, techniques for maximizing cover of data points in a UI are provided, e.g., using bins.

1. Example Bin Embodiments

Figure 7:
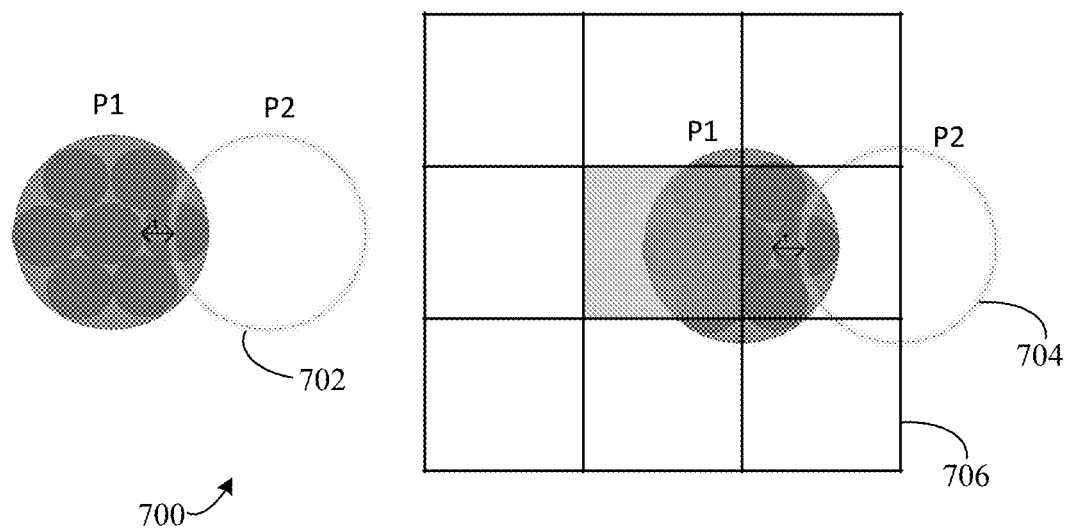
FIG. 7 shows a bin diagram for determining data point coverage, in accordance with an example embodiment.

FIG. 7 shows a bin diagram 700 for efficiently displaying data sets, in accordance with an example embodiment. Bin diagram 700 includes a data plot 702 and a bin data plot 704 (bin data plot 704 for brevity—additionally, bins referred to as "bins" for brevity). As illustrated, data plot 702 has two represented data points, P1 and P2, and bin data plot 704 shows represented data points P1 and P2 with a bin overlay, bins 706, exemplarily shown as a 3×3 grid of square bins, for illustrative purposes within the bounds of brevity, with a central bin associated with the "location" of P1.

Data plot 702 also shows P1 as being partially covered by P2. P1 is segmented into portions/sections of the represented data point, seven sections as shown (the smaller circles within P1), which will be discussed in further detail below. The embodiments herein allow for bin utilization to determine a number of represented data points that can overlap or cover at least a portion, up to all, of a given represented data point. Using bins such as bins 706, as described herein, the number of represented data points that can possibly cover a given represented data points can be identified, thus limiting the processing and memory required to determine overlaps/coverage.

As previously noted, bins may be squares of a grid, although other shapes and tessellations thereof, such as hexagons or other combinations of shapes, are also contemplated. A size for bins 706 in a grid may be chosen according the following parameters, in embodiments: Given a circle, such as the circle represented data point P1, with a radius value R0, which is the maximum distance away from its center that a similar circle, such as represented data point P2, can be located and still provide some cover for P1. An example equation, given the cover logic noted above, is shown below as Equation 1:

$$\text{BinSize}=(2*R0)-(R0/3)*(2-t). \qquad \text{Equation 1}$$

In this embodiment, with R0=0.1 and Tolerance ("t")=0.8, BinSize is 0.16. In a normalized rendering region, such as 100×100 generic units, as shown in FIG. 2, this yields a grid of 625×625 bins.

In this way, with respect to bin data plot 704 and bins 706, all the represented data points for a data set that can cover represented data points in the center bin, at radius value R0, are within the center bin and within the surrounding bins of bins 706 shown in bin data plot 704 of FIG. 7.

That is, considering radius value R0 for represented data points, it can be determined for each bin of a grid, on a bin-by-bin basis, which are the neighboring bins that can contain represented data points covering the represented data points inside it (also referred to as adjacent bins herein). Because represented data points are grouped by bin for an initial radius value of R0, for any other radius value, Rs, including a final radius value R, it can also be determined what their BinSize should be by following the same parameters as above for Eq. 1. Thus, a number of smaller bins (corresponding to R0) can be determined to make a bigger bin for represented data points having a radius value Rs larger than R0.

Figure 8:
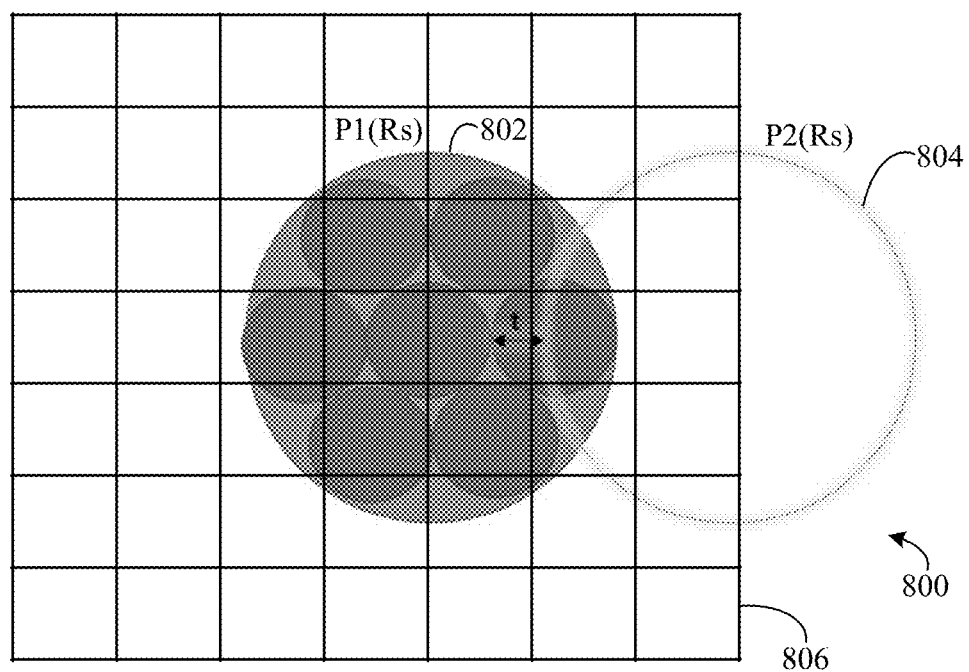
FIG. 8 shows a bin diagram with larger radius data points relative to FIG. 7, in accordance with an example embodiment.

FIG. 8 shows a bin diagram 800 for efficiently displaying data sets, in accordance with an example embodiment. As shown, P1(Rs) 802 and P2(Rs) 804 are represented data points over a grid of bins 806 (a 7 bin×7 bin grid). That is, bin diagram 800 illustrates a scenario for the grid of bins 706 in FIG. 7 with P1 and P2 of bin data plot 704 having a radius Rs=0.48 that was increased from R0=0.16.

For example, a BinSize0, for R0, is 0.16 as noted above, and the bin size for the current Rs is 0.48 in FIG. 8. Considering that the represented data points of a data set (e.g., here P1 and P1 in FIG. 7) are already grouped using BinSize0, it can be deduced that the bins required as neighboring/adjacent bins should be determined by looking 3 bins away for relevant represented data points (i.e., this scenario has a radius value Rs of 0.48 which is 3 times the radius value R0 (0.16)). In other words, instead of a 3×3 grid for bins 706 in FIG. 7 (which allows looking at 1 bin away from the bin of the represented data point), bins 806 is a 7×7 grid that allows looking 3 bins away for possible overlapping/covering represented data points.

2. Example Coverage Embodiments

A determination of neighboring bins (a.k.a., proximate, adjacent, etc., bins) that may include represented data points that could possibly cover a represented data point in a given bin allows for a determination of coverage. In embodiments, one or more criteria may be used to determine "coverage" of a represented data point. For example, a coverage of 100%, 80%, 60%, 50%, or any other percentage, of a represented data point may be used to determine that the represented data point is "covered" sufficiently so as to not include it in a rendering of the data set. In another example, as noted above, a represented data point may be divided into one or more sections or portions, such as the 7 sections illustrated in FIGS. 7-8. If a given number of sections of a represented data point are covered, the represented data point may be determined to be "covered." For instance, in embodiments, if 6 of 7 sections are covered, the represented data point may be determined as being "covered." A section may itself be said to be "covered" when a percentage thereof is overlapped (e.g., 100%, 80%, 60%, 50%, or any other percentage). In embodiments, both section coverage and represented data point percentage coverage may be required for a represented data point to be "covered."

Figure 9:
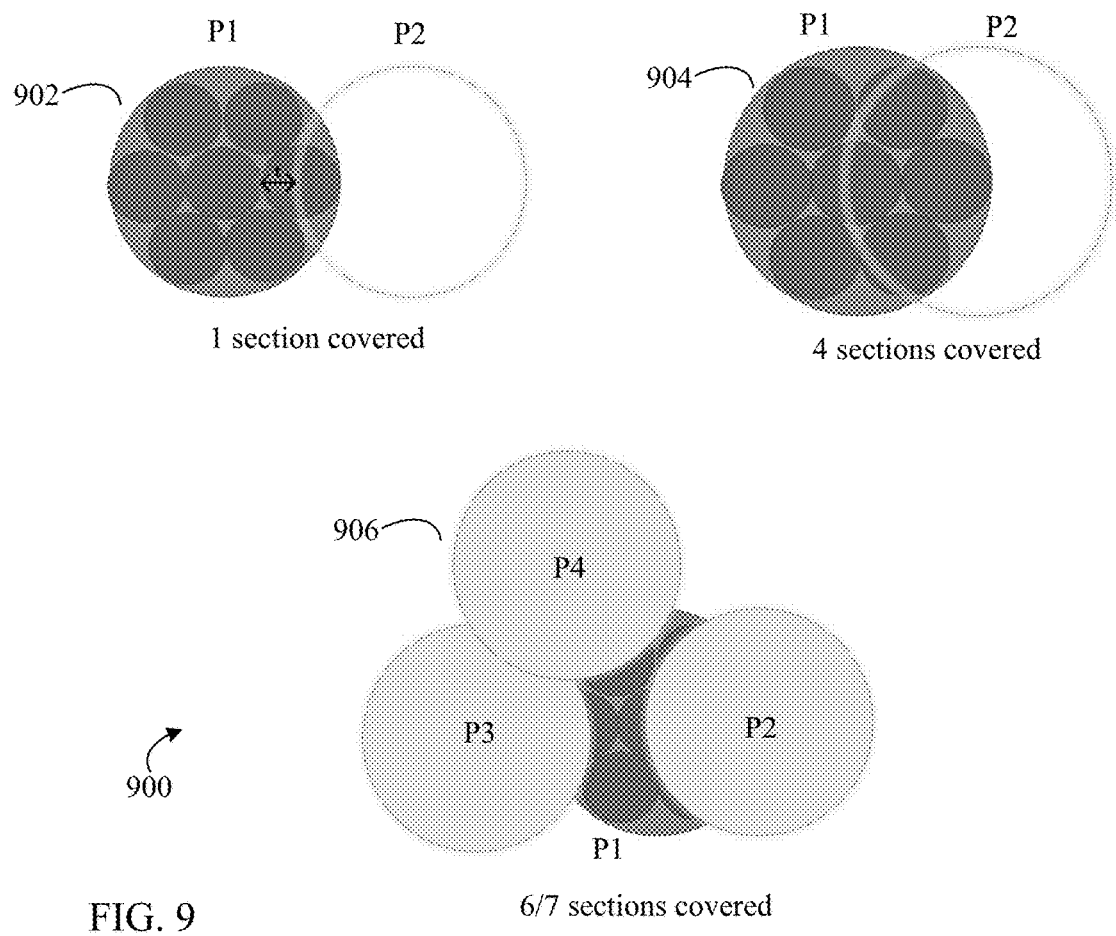
FIG. 9 shows three example coverage diagrams, in accordance with example embodiments.

FIG. 9 shows a coverage diagram 900 for efficiently displaying data sets, in accordance with an example embodiment. Coverage diagram 900 includes a first coverage plot 902, a second coverage plot 904, and a third coverage plot 906.

As illustrated, in first coverage plot 902, represented data point P1 has a single section thereof covered (e.g., more than approximately 50% of a single section, in the illustrated embodiment), and only a small percentage of the represented data point itself covered, by represented data point P2. According to embodiments, P1 is not "covered" by P2.

In second coverage plot 604, represented data point P1 has four sections covered (e.g., more than approximately 50% of four sections, in the illustrated embodiment), and less than half (e.g., approximately 50%) of the represented data point itself covered, by represented data point P2. According to embodiments, P1 is still not "covered" by P2. However, it should be noted that if P2 were further to the left and covered at least (approximately) ⁶⁄₇ of the sections of P1 and more than 80% of P1 (for example), P1 would be "covered" by the single represented data point P2. Also, in other embodiments, it is contemplated that the coverage shown in second coverage plot 604, or any other amount of coverage in various examples, is sufficient to provide that data point P1 is "covered" by data point P2.

In third coverage plot 606, represented data point P1 has six of seven sections covered (e.g., more than 50% of six sections, in the illustrated embodiment), and approximately 80% of the represented data point itself covered, by represented data points P2, P3, and P4, collectively. According to embodiments, P1 is "covered" (i.e., by the combination of P2, P3, and P4).

According to the embodiments herein, coverage determinations may be iteratively performed over each representation of a data point in a data set as described herein. However, it should be noted that for each iteration, a "covered" represented data point may be tracked, such as being marked, denoted, added to a subset of represented data points to not be rendered, removed from the data set for purposes of rendering, etc., such that when all the potential represented data points for coverage in bin and its neighboring bins are considered for coverage of a given represented data point, those "covered" represented data points are not considered. Likewise, any represented data point that are considered to cover sections of a "covered" represented data point are tracked, such as being marked, denoted, added to a subset of represented data points to be rendered, etc., to prevent these covering represented data points from being removed (at least until the represented data point radius value is increased in size in a subsequent iteration).

In embodiments, results of coverage determinations and iterations may be refined.

For instance, a radius value R1 may be determined that gives a represented data point count for rendering that is greater than the target, X>C, and a radius value R2 may be determined such that R2=R1*1.41, where X<C. Refinements may be performed in which a binary search is used, increasing and/or decreasing the radius values, looking for a radius value R between R1 and R2 that brings the representation count closer to the target count.

It should be noted, however, that depending on the represented data points present, X=C might not be possible. For example, consider 1000 represented data points right on top of each other, where one represented data point or relatively few represented data points, essentially cover all the rest.

In embodiments, if R0 allows for X<C, then refinements may not be performed because the quality and fidelity of the represented data points for the data set are sufficient. In the example embodiments, R0 (e.g., 0.1) may be 10 times smaller than the actually R used to render the final represented data points of the data set.

D. Example Embodiments for Adding Data Points Back for Rendering

In embodiments, removed data points may be added back to a second subset for rendering in a UI.

For example, after coverage iterations and/or refinements as described herein, represented data points may be added back when the representation count is less than the target count (e.g., threshold, numerical limit), X<C. In such cases, represented data points that were "covered" and thus removed from consideration for coverage of other represented data points and/or rendering (i.e., in the first subset) may be added back to the subset of represented data points to be rendered.

Figure 10:
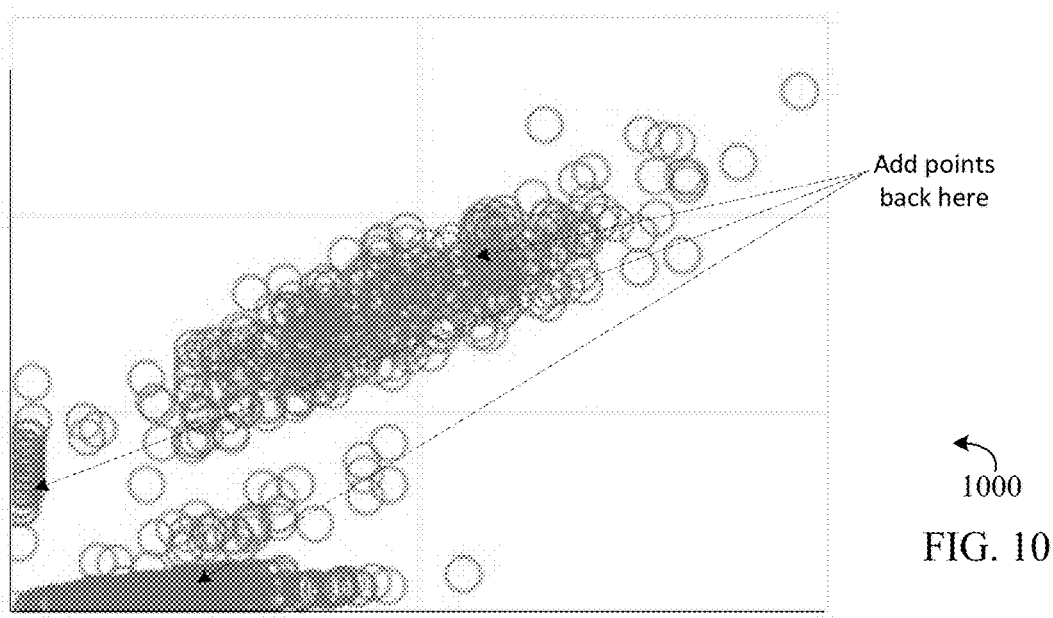
FIG. 10 shows a plot diagram for efficiently displaying data sets, in accordance with an example embodiment.

FIG. 10 shows a plot diagram 1000 for efficiently displaying data sets, in accordance with an example embodiment. Plot diagram 800 illustrates an example scenario where X<C subsequent to coverage iterations and/or refinements. As an illustrative example, if the target count is 5000 for plot diagram 1000, and the represented data points count is 4997 after coverage iterations and/or refinements, three represented data points may be added back for rendering. According to embodiments, represented data points may be added back to the subset of represented data points to be rendered proportionally to the density of the original data set.

E. Example Embodiments for Remote Devices and Rendering Multiple Data Sets

In some embodiments, techniques for efficient display of data points may be performed by remote devices, e.g., user devices. Additionally, efficient display of data points may include rendering multiple data sets in a single UI. These embodiments are described below in this subsection.

Figure 11:
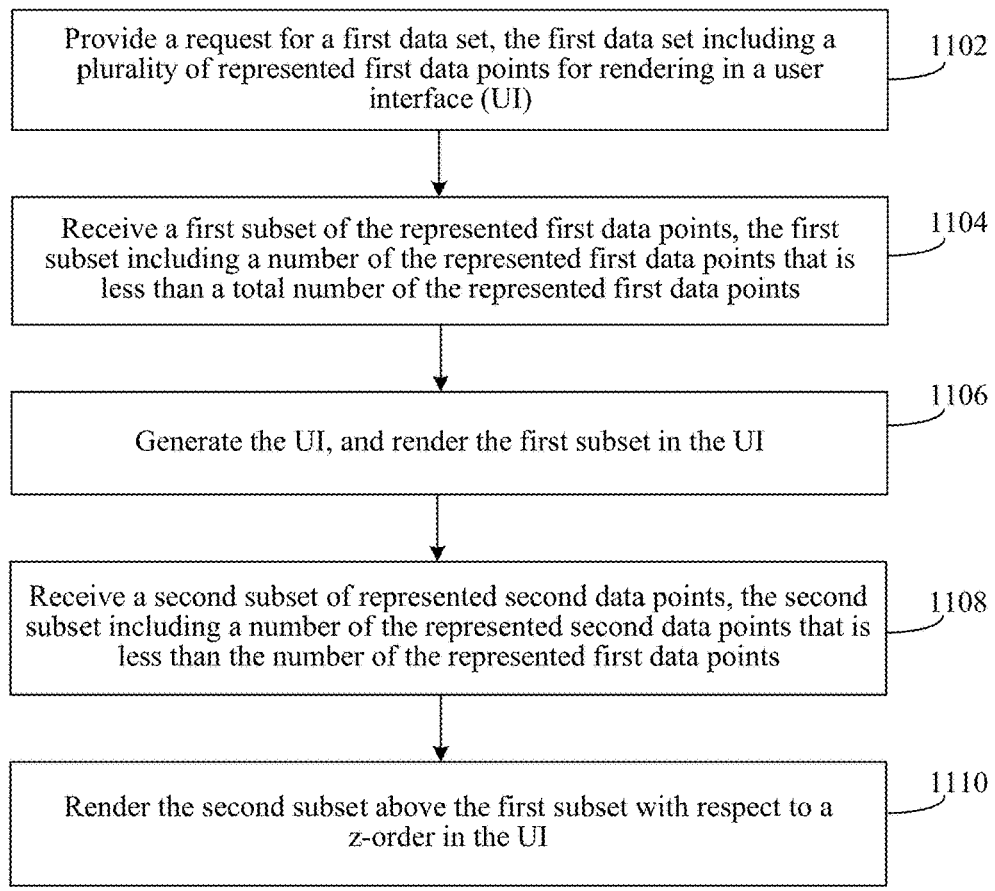
FIG. 11 shows a flowchart for efficiently displaying data sets, in accordance with an example embodiment.

Referring now to FIG. 11, a flowchart 1100 for efficient display of data points is shown, according to an example embodiment. For purposes of illustration, flowchart 1100 of FIG. 11 is described with respect to system 200 of FIG. 2 and its subcomponents including coverage determiner 208, as well as rendering system 100 and remote devices 102a-102b of FIG. 1. That is, system 200 and remote devices 102a-102b may perform various functions and operations in accordance with flowchart 1100 for efficient display of data points. As noted above, system 200 may be an embodiment of remote device 102a and/or remote device 102b. Further structural and operational examples will be apparent to persons skilled in the relevant art(s) based on the following description. Flowchart 1100 is described as follows.

Flowchart 1100 begins at step 1102. In step 1102, a request is provided for a first data set, the first data set including a plurality of first data points for rendering in a user interface (UI). For example, a remote device such as remote device 102a or remote device 102b may request a data set for rendering from host server 104.

In step 1104, a first subset of the first data points is received, the first subset including a number of the first data points that is less than a total number of the first data points. For instance, host server 104 may return the first subset responsive to the request in step 1102 to be received by remote device 102a or remote device 102b. Host server 104 (or computing system 200), may perform coverage processing as described herein before returning the first subset.

In step 1106, the UI is generated, and the first subset in the UI is rendered. For example, remote device 102a or remote device 102b may generate a UI, or a portion thereof, in which to render the received subset of represented data points. UI generation and rendering may be managed by renderer 112a or 112b of FIG. 1, and/or by render manager 220 of FIG. 2. For example, renderer 112a, renderer 112b, or render manager 220 may generate a 600×600 pixel portion of a UI in which the first subset is rendered.

In step 1108, a second subset of second data points is received responsive to providing a request for a second data set, the second data set including a plurality of second data points for rendering in the UI. For instance, remote device 102a or remote device 102b may request another data set for rendering from host server 104, and subsequent to coverage processing, the data set, or a subset thereof, may be received by remote device 102a or remote device 102b. In some embodiments, steps 1102 and 1108 may be performed concurrently or together, i.e., a user receives two sets to render responsive to requesting two data sets for rendering. In such cases, host server 104 may perform the described coverage processing independently on each data set.

In step 1110, the second subset is rendered above the first subset with respect to a z-order in the UI. Renderer 112a, renderer 112b, or render manager 220 may be configured to render multiple data sets, or subsets thereof, in particular orders based on characteristics of the data sets, or subsets thereof. For example, a data set that is less dense may be rendered "above" or "on top of" a denser data set. Likewise, a less numerous data set may be rendered above a more numerous data set. In other words, the rendering is performed with respect to a z-order of the UI in which the rendering takes place such that when the user views the two data sets rendered together in the UI, the less dense data set appears to be over the denser data set.

Figure 12:
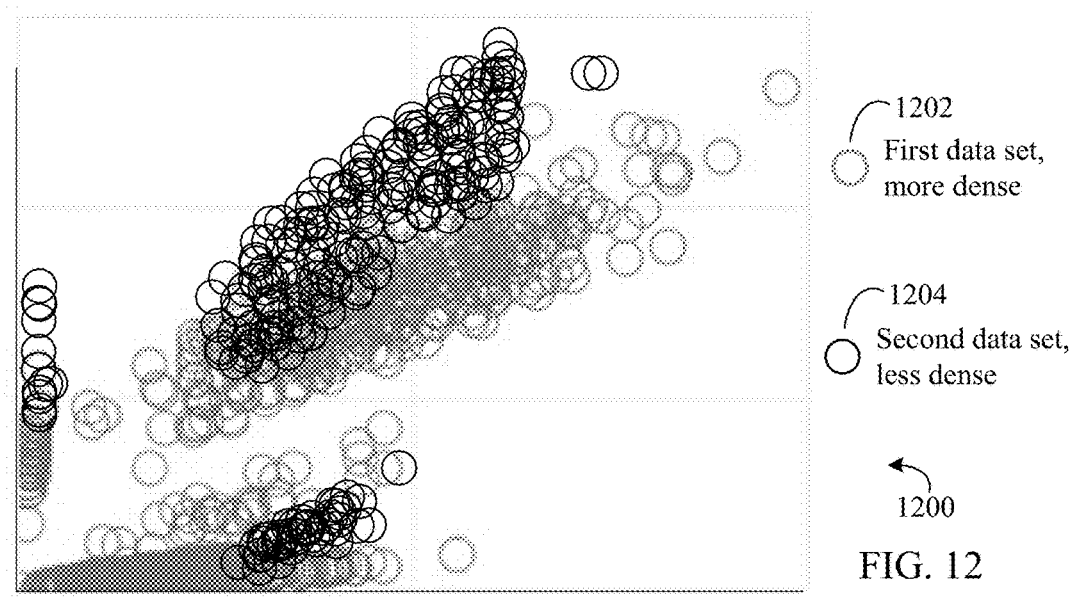
FIG. 12 shows a plot diagram for efficiently displaying data sets, in accordance with an example embodiment.

Turning now to FIG. 12, a plot diagram 1200 for efficiently displaying data sets is shown, in accordance with an example embodiment. Plot diagram 1200 illustrates a less dense data set 1204 rendered above a denser data set 1202, with respect to a z-order, in a UI as described in step 1110 of flowchart 1100 above. That is, a renderer such as renderer 112a and/or renderer 112b of FIG. 1, and render manager 220 of FIG. 1, may be configured to order the rendering of data sets according to density or number of data points, etc.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described herein, including rendering system 100 of FIG. 1 and system 200 of FIG. 2, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 13:
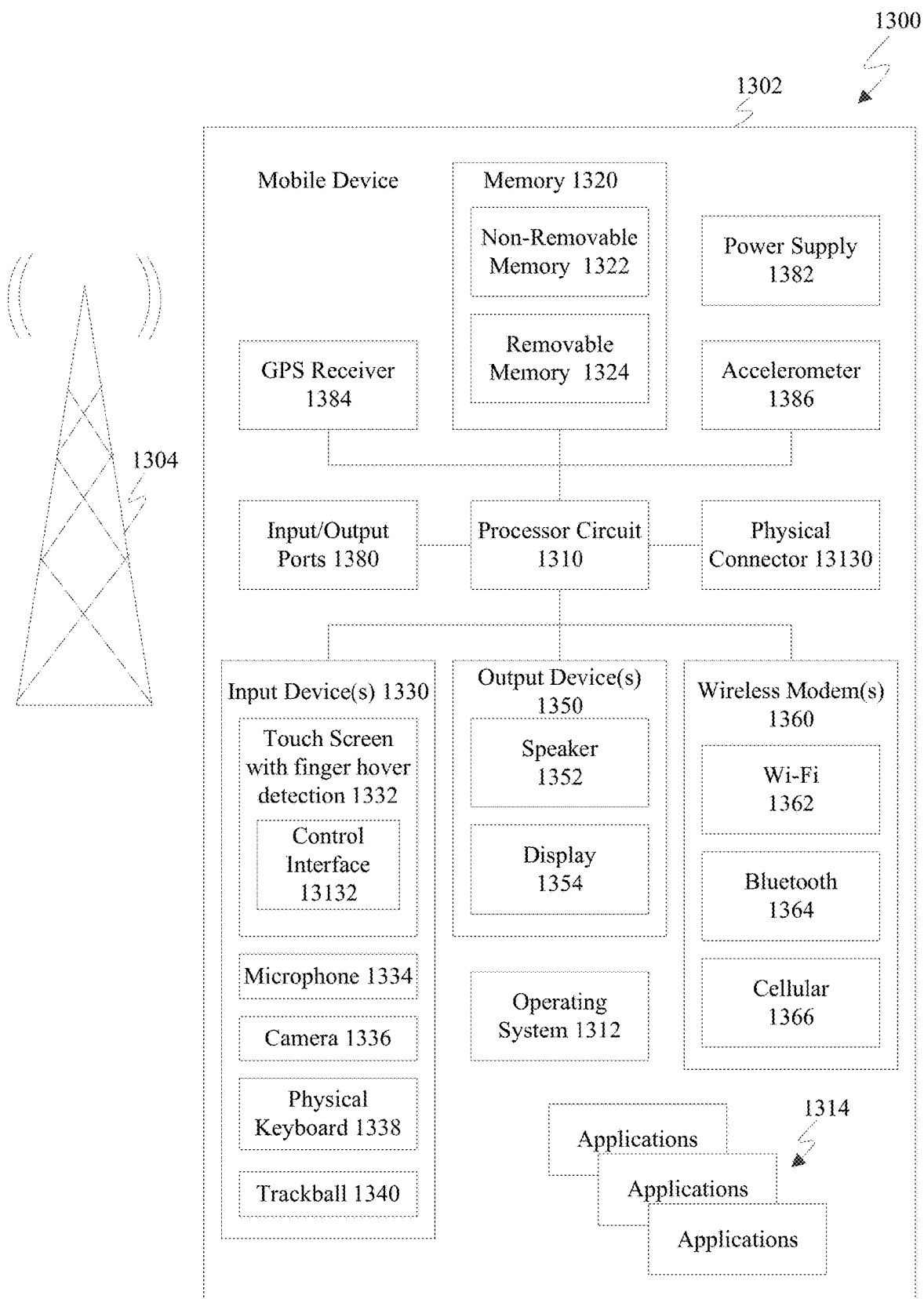
FIG. 13 shows a block diagram of an example mobile device that may be used to implement various example embodiments.

FIG. 13 is a block diagram of an exemplary mobile system 1300 that includes a mobile device 1302 that may implement embodiments described herein. For example, mobile device 1302 may be used to implement any system, client, or device, or components/subcomponents thereof, in the preceding sections. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smart phone, handheld computer, Personal Digital Assistant (PDA), etc.) and can allow wireless two-way communications with one or more mobile communications networks 1304, such as a cellular or satellite network, or with a local area or wide area network.

Mobile device 1302 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and provide support for one or more application programs 1314 (also referred to as "applications" or "apps"). Application programs 1314 may include common mobile computing applications (e.g., e-mail applications, calendars, contact managers, web browsers, messaging applications) and any other computing applications (e.g., word processing applications, mapping applications, media player applications).

Mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and application programs 1314. Example data can include web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1320. These programs include operating system 1312, one or more application programs 1314, and other program modules and program data. Examples of such application programs or program modules may include, for example, computer program logic (e.g., computer program code or instructions) for implementing one or more of rendering system 100 of FIG. 1 and system 200 of FIG. 2, along with any components and/or subcomponents thereof, as well as the plots and flowcharts/flow diagrams and/or further examples described herein.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Other possible output devices (not shown) can include piezoelectric or other haptic output devices. Some devices can serve more than one input/output function. For example, touch screen 1332 and display 1354 can be combined in a single input/output device. Input devices 1330 can include a Natural User Interface (NUI).

Wireless modem(s) 1360 can be coupled to antenna(s) (not shown) and can support two-way communications between processor 1310 and external devices, as is well understood in the art. Modem(s) 1360 are shown generically and can include a cellular modem 1366 for communicating with the mobile communication network 1304 and/or other radio-based modems (e.g., Bluetooth 1364 and/or Wi-Fi 1362). At least one of wireless modem(s) 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, mobile device 1302 is configured to implement any of the above-described features of flowcharts herein. Computer program logic for performing any of the operations, steps, and/or functions described herein may be stored in memory 1320 and executed by processor 1310.

Figure 14:
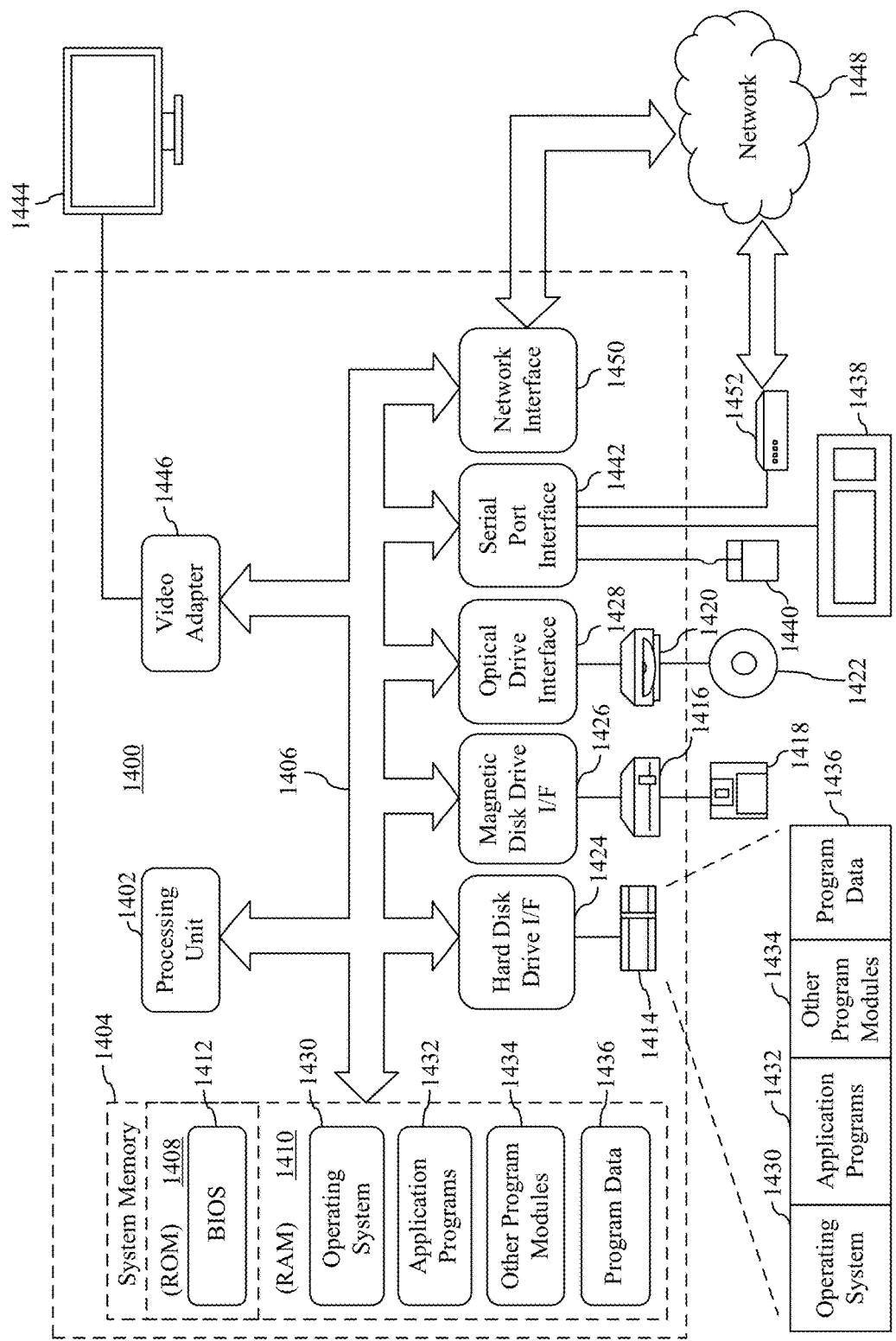
FIG. 14 shows a block diagram of an example computing device that may be used to implement embodiments.

FIG. 14 depicts an exemplary implementation of a computing device 1400 in which embodiments may be implemented. For example, embodiments described herein may be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems, as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1430, one or more application programs 1432, other programs 1434, and program data 1436. Application programs 1432 or other programs 1434 may include, for example, computer program logic (e.g., computer program code or instructions) for implementing embodiments described herein, such as rendering system 100 of FIG. 1 and system 200 of FIG. 2, along with any components and/or subcomponents thereof, as well as the plots and flowcharts/flow diagrams described herein and/or further examples described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to refer to physical hardware media such as the hard disk associated with hard disk drive 1414, removable magnetic disk 1418, removable optical disk 1422, other physical hardware media such as RAMs, ROMs, flash memory cards, digital video disks, zip disks, MEMs, nanotechnology-based storage devices, and further types of physical/tangible hardware storage media (including memory 1420 of FIG. 14). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

The additional examples and embodiments described in this Section may be applicable to examples disclosed in any other Section or subsection of this disclosure.

A system is described herein. The system may be configured and enabled in various ways to provide efficient display of data points in a UI, as described herein. The system includes a processor and a memory that stores program code to be executed by the processor. The program code includes a radius generator configured to set data points of a data set to each have a same first radius value, each data point having a same area defined by the first radius value, and coordinate space coordinates stored in a memory data structure defining the data set. The program code also includes a subset generator configured to, for each region of the coordinate space, identify, in the memory data structure, data points having coordinates in the region and being covered by other data points by a predetermined amount. The subset generator is also configured to include, in a rendering subset of the data set, each data point other than the identified data points. The program code also includes a communicator configured to provide the rendering subset to a renderer.

In an embodiment of the system, the program code further includes a normalizer configured to proportionally normalize the coordinates of the data set in at least two-dimensions.

In an embodiment of the system, the predetermined amount is half of an area of a data point, or the predetermined amount is six-sevenths of an area of a data point or is more than six-sevenths of the area.

In an embodiment of the system, the subset generator is configured to determine that the number of data points in the rendering subset has a predetermined relationship with a predetermined numerical limit of data points for the rendering subset, and the radius generator is configured to increase the first radius value to a second radius value for the data points in the rendering subset. In the embodiment of the system, the subset generator is further configured to, for each region of the coordinate space, using the data points having the second radius value, identify, in the memory data structure, data points having coordinates in the region and being covered by other data points by a predetermined amount, and add to the rendering subset of the data set, each data point other than the identified data points.

In an embodiment of the system, the subset generator is configured to iterate, for increasing radius values set for the data points by the radius generator, generation of the rendering subset until the numerical limit is not exceeded by, or is greater than, the number of data points in the rendering subset.

In an embodiment of the system, in response to the subset generator determining that the number of data points in the rendering subset is less than the numerical limit and within a predetermined amount of the numerical limit, the radius generator is configured to perform a binary search for radius values between the first radius value and the second radius value such that the numerical limit is not exceeded by the number of data points in the rendering subset.

In an embodiment of the system, the subset generator is configured to determine that the number of data points in the rendering subset is less than, and within a predetermined amount of, a numerical limit of allowed data points, and to add one or more data points to the rendering subset without exceeding the numerical limit.

A computer-implemented method is also described herein. The method may be for efficient display of data points in a UI, as described herein. The method includes accessing a data set, stored in a memory data structure, that includes data points having coordinates in a coordinate space. The method also includes setting a same first radius value for the data points of the data set, each data point having a same area defined by the first radius value. The method further includes, for each region associated with the coordinate space, identifying, in the memory data structure, data points having coordinates in the region and being covered by other data points by a predetermined amount, and including, in a rendering subset of the data set, each data point other than the identified data points. The method still further includes providing the rendering subset to a renderer.

In an embodiment, the method includes proportionally normalizing the coordinates of the data set in at least two-dimensions.

In an embodiment of the method, an area of each region is proportional to the first radius value. In the embodiment of the method, the predetermined amount is half of the area of the first data point, or the predetermined portion is six-sevenths of the area of the first data point or is more than six-sevenths of the area of the first data point.

In an embodiment, the method includes determining that the number of data points in the rendering subset has a predetermined relationship with a predetermined numerical limit of data points for the rendering subset, and increasing the first radius value to a second radius value for the data points in the rendering subset. In the embodiment, the method includes, for each region of the coordinate space, using the data points having the second radius value, identifying second data points having coordinates in the region and being covered by other data points by the predetermined amount, and adding, to the rendering subset of the data set, each data point of the data points having the second radius value other than the identified second data points.

In an embodiment, the method includes, in response to determining that the number of data points in the rendering subset is less than the numerical limit and within a predetermined amount of the numerical limit, performing a binary search for radius values between the first radius value and the second radius value such that the numerical limit is not exceeded by the number of data points in the rendering subset.

In an embodiment, the method includes determining that the number of data points in the rendering subset is less than, and within a predetermined amount of, a numerical limit of allowed data points, and adding one or more data points to the rendering subset without exceeding the numerical limit.

In an embodiment, the method includes assigning a rendering characteristic to a data point in the rendering subset based on a measure of density associated with data points of the rendering subset.

In an embodiment, the method includes assigning a rendering characteristic to a data point in the rendering subset based on a measure of density associated with the data points of the data set.

Another system is described herein. The system may be configured and enabled in various ways to provide efficient display of data points in a UI, as described herein. The system includes a processor and a memory that stores program code to be executed by the processor. The program code includes a subset generator configured to access a data set, stored in a memory data structure, that includes a first data point and a second point having coordinates in a coordinate space. The program code also includes a radius generator configured to set a same first radius value for the first data point and the second point, the first data point and the second point having a same area defined by the first radius value. The program code also includes a communicator. The subset generator is configured to, for a first region associated with the coordinate space, identify, in the memory data structure, the first data point as having coordinates in the first region, the second data point as having coordinates in a second region, and the first data point being covered by the second data point by a predetermined amount. The subset generator is also configured to include, in a rendering subset of the data set, the second data point, and exclude the first data point from the rendering subset due to being covered. The communicator is configured to provide the rendering subset to a renderer.

In an embodiment of the system, the subset generator, to determine that a data point is covered, is configured to determine that the area of the first data point is overlapped by the area of the second data point by the predetermined amount based on the first radius value, the coordinates of the first data point, and the coordinates of the second data point. In the embodiment, the predetermined amount is half of the area of the first data point, or the predetermined portion is six-sevenths of the area of the first data point or is more than six-sevenths of the area of the first data point.

In an embodiment of the system, the second data point has coordinates within a predefined distance of the first region.

In an embodiment of the system, the radius generator is configured to increase a prior radius value to the first radius value subsequent to a determination that the first data point was uncovered by the second data point for the prior radius value.

In an embodiment of the system, the radius generator is configured to set a third data point of the data set to have the first radius value and the area defined by the first radius value, and the subset generator is configured to exclude the third data point from consideration in determining the first data point is covered based on the third data point having coordinates a predefined distance outside of the region.

Still another system is also described herein. The system may be configured and enabled in various ways to provide efficient display of data points in a UI, as described herein. The system includes a memory configured to store program instructions, and a processor configured to execute the program instructions. The program instructions include a communicator configured to provide a request for a first data set, the first data set including a plurality of first data points for rendering in a user interface (UI), and receive a first subset of the first data points, the first subset including a number of the first data points that is less than a total number of the first data points. The program instructions also include a render manager configured to generate the UI, and render the first subset in the UI.

In an embodiment of the system, the communicator is configured to provide a request for a second data set, the second data set including a plurality of second data points for rendering in the UI, and receive a second subset of the second data points. In the embodiment, the render manager is configured to render the second subset in the UI with the first subset.

In the embodiment, the second subset includes a number of the second data points that is less than the number of the first data points, and the render manager is configured to render the second subset above the first subset with respect to a z-order in the UI.

In an embodiment of the system, the second subset includes a number of the second data points that is less than a total number of the second data points.

In an embodiment of the system, the communicator is configured to include a resolution for the UI in the request for the first data set, and the number of the first data points in the first subset is based on the resolution.

IV. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
   a processor; and
   a memory that stores program code configured to be executed by the processor, the program code including:
      a normalizer configured to receive a data set that includes data points, each data point having coordinates in a coordinate space stored in a memory data structure defining the data set; and
      a subset generator configured to:
         for each region of the coordinate space, identify, in the memory data structure, data points having coordinates in the region and being covered by other data points by a predetermined amount; and
         include, in a rendering subset of the data set, each data point other than the identified data points.

2. The system of claim 1, wherein the normalizer is configured to proportionally normalize the coordinates of the data set in at least two-dimensions.

3. The system of claim 2, wherein the normalizer is configured to proportionally normalize the coordinates of the data set based at least on a resolution of a user interface (UI).

4. The system of claim 1, wherein the predetermined amount is at least half of an area of a data point.

5. The system of claim 1, further comprising a radius generator;
   wherein the subset generator is configured to:
      determine that the number of data points in the rendering subset has a predetermined relationship with a predetermined numerical limit of data points for the rendering subset;
   wherein the radius generator is configured to:
      increase respective first radius values to respective second radius values for the data points in the rendering subset; and
   wherein the subset generator is further configured to:
      for each region of the coordinate space, using the data points having the respective second radius values, identify, in the memory data structure, data points having coordinates in the region and being covered by other data points by a predetermined amount; and
      add to the rendering subset of the data set, each data point other than the identified data points.

6. The system of claim 5, wherein the subset generator is configured to:
   iterate, for increasing radius values set for the data points by the radius generator, generation of the rendering subset until the numerical limit is not exceeded by, or is greater than, the number of data points in the rendering subset.

7. The system of claim 5, wherein, in response to the subset generator determining that the number of data points in the rendering subset is less than the numerical limit and within a predetermined amount of the numerical limit, the radius generator is configured to:
   perform a binary search for radius values between the first respective radius values and the second respective radius values such that the numerical limit is not exceeded by the number of data points in the rendering subset.

8. The system of claim 1, wherein the subset generator is configured to:
   determine that the number of data points in the rendering subset is less than, and within a predetermined amount of, a numerical limit of allowed data points; and
   add one or more data points to the rendering subset without exceeding the numerical limit.

9. A computer-implemented method comprising:

accessing a data set, stored in a memory data structure, that includes data points having coordinates in a coordinate space, each data point having a respective area;

for each region associated with the coordinate space:
identifying, in the memory data structure, data points having coordinates in the region and being covered by other data points by a predetermined amount, and including, in a rendering subset of the data set, each data point other than the identified data points; and
providing the rendering subset to a renderer of a user interface (UI).

10. The computer-implemented method of claim 9, further comprising at least one of:
proportionally normalizing the coordinates of the data set in at least two-dimensions; and
proportionally normalizing the coordinates of the data set in at least two-dimensions based on a resolution of the UI.

11. The computer-implemented method of claim 9, wherein an area of each region is proportional to a radius value of one of the data points; and
wherein the predetermined amount is at least half of the respective area of the one of the data points.

12. The computer-implemented method of claim 9, further comprising:
determining that a number of data points in the rendering subset has a predetermined relationship with a predetermined numerical limit of data points for the rendering subset;
increasing respective radius values for one or more of the data points in the rendering subset; and
for each region of the coordinate space, using the one or more data points having the increased respective radius values,
identifying removable data points as having coordinates in the region and as being covered by other data points by the predetermined amount, and
adding, to the rendering subset of the data set, each data point of the data points having the increased respective radius values other than the identified removable data points.

13. The computer-implemented method of claim 12, further comprising:
in response to determining that the number of data points in the rendering subset is less than the numerical limit and within a predetermined amount of the numerical limit; and
performing a binary search for radius values between the respective radius values and the increased respective radius values such that the numerical limit is not exceeded by the number of data points in the rendering subset.

14. The computer-implemented method of claim 9, further comprising:
determining that the number of data points in the rendering subset is less than, and within a predetermined amount of, a numerical limit of allowed data points; and
adding additional ones of the data points to the rendering subset without exceeding the numerical limit.

15. The computer-implemented method of claim 9, further comprising:
assigning a rendering characteristic to a data point in the rendering subset based on a measure of density associated with at least one of data points of the rendering subset and the data points of the data set, the rendering characteristic including at least one of color, hue, brightness, opacity, and shape.

16. A system comprising:
a processor; and
a memory that stores program code configured to be executed by the processor, the program code including:
a communicator configured to:
provide a request for a first data set, the first data set including a plurality of first data points having coordinates in a coordinate space for rendering in a user interface (UI), and
receive a first subset of the first data points in response to the request, the first subset including a number of the first data points that is less than a total number of the first data points and excluding, by regions of the coordinate space, an excluded number of the first data points identified as being covered by other data points of the first data points by a predetermined amount;
a render manager configured to generate the UI, and render the first subset in the UI.

17. The system of claim 16, wherein the communicator is configured to:
provide a request for a second data set, the second data set including a plurality of second data points for rendering in the UI, and
receive a second subset of the second data points, the second subset including a number of the second data points that is less than the number of the first data points; and wherein the render manager is configured to:
render the second subset above the first subset with respect to a z-order in the UI.

18. The system of claim 17, wherein the second subset includes a number of the second data points that is less than a total number of the second data points.

19. The system of claim 16, wherein the communicator is configured to:
include a resolution for the UI in the request for the first data set; and
wherein the number of the first data points in the first subset is based at least on the resolution.

20. The system of claim 16, wherein the render manager is configured to:
assign rendering characteristic to a data point in the first subset based on a measure of density associated with at least one of data points of the first subset and the data points of the data set, the rendering characteristic including at least one of color, hue, brightness, opacity, and shape.

* * * * *